(12) United States Patent
Payling et al.

(10) Patent No.: US 12,527,526 B2
(45) Date of Patent: Jan. 20, 2026

(54) DIAGNOSTIC TOOL

(71) Applicant: C The Signs Limited, London (GB)

(72) Inventors: Miles Payling, London (GB); Bhavagaya Bakshi, London (GB)

(73) Assignee: C The Signs Limited, London (GB)

( * ) Notice: Subject to any disclaimer, the term of this patent is extended or adjusted under 35 U.S.C. 154(b) by 482 days.

(21) Appl. No.: 17/766,661

(22) PCT Filed: Feb. 5, 2020

(86) PCT No.: PCT/EP2020/052896
§ 371 (c)(1),
(2) Date: Apr. 5, 2022

(87) PCT Pub. No.: WO2021/069105
PCT Pub. Date: Apr. 15, 2021

(65) Prior Publication Data
US 2024/0055121 A1   Feb. 15, 2024

(30) Foreign Application Priority Data
Oct. 11, 2019 (EP) .................................... 19202792

(51) Int. Cl.
*A61B 5/00* (2006.01)
*G06N 3/02* (2006.01)
(Continued)

(52) U.S. Cl.
CPC ............ *A61B 5/7264* (2013.01); *G06N 3/02* (2013.01); *G16H 10/60* (2018.01); *G16H 50/20* (2018.01); *G16H 50/30* (2018.01); *G16H 50/70* (2018.01)

(58) Field of Classification Search
CPC ...... A61B 5/7264; G16H 10/60; G16H 50/30; G16H 50/70; G16H 50/20; G06N 3/02
See application file for complete search history.

(56) References Cited

U.S. PATENT DOCUMENTS 7,487,134 B2 * 2/2009 Grichnik ................ G16H 50/20
  703/2
7,584,166 B2 * 9/2009 Grichnik ................ G16H 50/30
  706/62
(Continued)

FOREIGN PATENT DOCUMENTS

CN        104951894 B    7/2018
JP        2006053628 A   2/2006
(Continued)

OTHER PUBLICATIONS

Murphree, 2018, Elsevier, pp. 109-115.*
(Continued)

*Primary Examiner* — Michael I Ezewoko
(74) *Attorney, Agent, or Firm* — Wolf, Greenfield & Sacks, P.C.

(57) ABSTRACT

Disclosed herein is a method for diagnosing a medical condition in a patient. The method comprises: obtaining, from the patient, a plurality of physiological values; implementing a first model configured to determine risk values for at least one of a plurality of medical conditions, based on the physiological values. Implementing the first model comprises: obtaining a first risk value for the at least one medical condition, based on a first one of the obtained physiological values; and weighting the first risk value based on a second one of the obtained physiological values, to determine a total risk value of the at least one medical condition for the patient.

4 Claims, 5 Drawing Sheets

(51) Int. Cl.
*G16H 10/60* (2018.01)
*G16H 50/20* (2018.01)
*G16H 50/30* (2018.01)
*G16H 50/70* (2018.01)

(56) References Cited

U.S. PATENT DOCUMENTS

| | | | | |
|---|---|---|---|---|
| 8,337,404 | B2* | 12/2012 | Osorio | A61B 5/14539 600/301 |
| 8,510,126 | B2* | 8/2013 | Martin | G16H 50/30 600/300 |
| 8,744,870 | B2* | 6/2014 | Shastri | G16H 50/20 705/2 |
| 9,057,736 | B2* | 6/2015 | Urdea | G16H 50/30 |
| 9,689,880 | B2* | 6/2017 | Urdea | G01N 33/6845 |
| 9,952,220 | B2* | 4/2018 | Michalek | G01N 33/57423 |
| 10,386,379 | B1* | 8/2019 | Khomami Abadi | G01N 35/00722 |
| 10,485,490 | B2* | 11/2019 | Freeman | G16H 40/63 |
| 10,687,193 | B2* | 6/2020 | Booth | G06F 1/3287 |
| 10,755,369 | B2* | 8/2020 | Amarasingham | G06N 5/04 |
| 10,932,726 | B2* | 3/2021 | Volosin | A61B 5/1102 |
| 10,997,397 | B2* | 5/2021 | Wang | G06F 18/217 |
| 11,154,251 | B2* | 10/2021 | Genov | G06N 20/00 |
| 11,244,764 | B2* | 2/2022 | Kailasam | G16H 50/70 |
| 11,468,998 | B2* | 10/2022 | Koblick | G06N 3/006 |
| 11,759,152 | B2* | 9/2023 | Freeman | G16H 50/20 600/323 |
| 11,790,297 | B2* | 10/2023 | Lyman | G06T 5/50 705/3 |
| 11,887,738 | B2* | 1/2024 | Shrager | G16H 50/20 |
| 11,906,533 | B2* | 2/2024 | Khomami Abadi | G01N 35/00722 |
| 2007/0094048 | A1* | 4/2007 | Grichnik | G16H 50/20 705/2 |
| 2007/0179769 | A1* | 8/2007 | Grichnik | G16Z 99/00 703/11 |
| 2012/0150498 | A1* | 6/2012 | Shastri | G16H 10/60 703/2 |
| 2012/0278099 | A1* | 11/2012 | Kelly | G16H 10/60 705/2 |
| 2012/0310667 | A1* | 12/2012 | Altman | G16H 70/20 705/3 |
| 2013/0267442 | A1* | 10/2013 | Urdea | C12Q 1/6883 506/39 |
| 2017/0286621 | A1* | 10/2017 | Cox | G16H 50/20 |
| 2017/0300656 | A1* | 10/2017 | Cox | G16H 50/20 |
| 2018/0068083 | A1* | 3/2018 | Cohen | G16H 50/20 |
| 2018/0173854 | A1* | 6/2018 | Kailasam | G16H 50/20 |
| 2019/0065688 | A1 | 2/2019 | Lee et al. | |
| 2019/0221311 | A1* | 7/2019 | Takeuchi | G06N 3/02 |
| 2019/0259499 | A1* | 8/2019 | Hong | G16H 50/20 |
| 2020/0234830 | A1* | 7/2020 | Costa | G16H 10/60 |
| 2022/0310267 | A1* | 9/2022 | Cox | G16H 50/20 |
| 2023/0060794 | A1* | 3/2023 | Payling | G16H 10/60 |

FOREIGN PATENT DOCUMENTS

| | | |
|---|---|---|
| JP | 2017515127 A | 6/2017 |
| JP | 2018088263 A | 6/2018 |
| JP | 2019513993 A | 5/2019 |

OTHER PUBLICATIONS

Japanese Notice of Reasons for Refusal for Japanese Patent Application No. 2022-521723, dated Jan. 31, 2024, 12 pages.
European Search Report for Application No. EP19202792, dated Mar. 9, 2020, 2 pages.
Written Opinion and International Search Report for Application No. PCT/EP2020/052896, dated May 13, 2020, 13 pages.
Sinha, et al., Contextual Care Protocol using Neural Networks and Decision Trees, 2018 Second International Conference on Advances in Electronics, Computer and Communications, Nov. 15, 2018, 4 pages.
European Office Action for Application No. 19 202 792.8-1122, dated Apr. 19, 2024, 10 pages.
European Search Report for Application No. EP24180867, dated Aug. 29, 2024, 12 pages.
Stralen, et al., Diagnostic Methods I: Sensitivity, Specificity, and Other Measures of Accuracy, abc of epidemiology, Apr. 1, 2009, 7 pages.
Sinha et al., Contextual Care Protocol Using Neural Networks and Decision Trees, dated Nov. 15, 2018, 4 pages.

* cited by examiner

502

Baseline risk calculated as point prevalence in the popuolation based on demographics (e.g. age, gender address ethnicity etc.)

500

501
Patient factors (risk factors, symptoms, signs and investigation results) are received from the electronic health record or by input (from the clinician or patient)

503
A Bayesian model iterates over the previous patient data in the database (including both cancer and non-cancer patients) calculating the risk of all possible combinations of the factors being cancer. The data may also include patients extracted from other datasets

504
The health authority sets a threshold for detection (e.g. 3%)

507
Commissioned pathways in the health authority set as the baseline availability (so pathways cannot stray outside of those commisioned)

505
The patient's risk percentages for cancer are matched to the threshold set by the health authority, so all cancer risk percentages above the threshold are presented.

506
Patient's non-cancer factor combinations excluded

510
The health authority sets the priorities for cancer pathways (e,g, cost, time, sensitivity and specificity) to determine which pathway should be recommended. These are set like dials, so rather than a single property being prioritised, each priority can have a threshold set

508
A Bayesian model iterates over the previous patient data in the database (including both cancer and non-cancer patients) using the cost and calculating the time it takes to complete, as well as the sensitivity ad specificity of the possible pathways available (e.g. tests, investigations or referrals)

509
This model can retrospectively be applied to the health authorities cancer patients to determine identify how different priorities would adjust cost, time and accuracy.

511
The cancer(s) the patient is at risk of and the appropriate pathways are presented to the clinican.

FIG. 5

DIAGNOSTIC TOOL

CROSS REFERENCE TO RELATED APPLICATIONS

This application is a national stage filing under 35 U.S.C. § 371 of international application number PCT/EP2020/052896, filed Feb. 5, 2020, titled "DIAGNOSTIC TOOL", which claims priority from European application number 19202792.8, filed Oct. 11, 2019, "DIAGNOSTIC TOOL".

TECHNICAL FIELD

The present disclosure relates to systems and methods for diagnosing one or more medical conditions, including using machine learning techniques to identify the risk of such conditions and to determine a suitable diagnosis pathway.

BACKGROUND

Certain medical conditions, such as cancer, can prove extremely difficult to diagnose conventionally. There may be no single symptom that directly alerts clinicians to a particular diagnosis, or that even directs them to a specific pathway, such as a test or investigation, to determine such a diagnosis. These conditions may instead be a collection of up to several hundred different diseases, each with their own signs, symptoms and risk factors, which at an early stage may be vague and overlap with less serious conditions. Therefore identifying a condition or appropriate diagnosis pathway at an initial stage when symptoms first emerge, e.g. at a general practice medical appointment, may prove especially challenging.

Moreover, information that may aid a medical practitioner in deciding on a course of action or reaching a diagnosis may be contained in many disparate sources. For example, given the multifaceted way in which certain conditions present themselves, it may not be possible, conventionally, for a clinician to have all the information that is required to make such a decision at their immediate disposal.

In recent years, there has been an increase in the implementation of both cloud-based technology and application software, to address a range of technical problems. Furthermore, through the provision of increased computing power and access to increasingly large quantities of suitable training data, machine learning techniques have found increasing application for providing improved solutions to many technical problems. In particular, use of neural networks has become increasingly common as a way of providing neat and effective solutions to many such technical problems.

Embodiments of the present disclosure may address some or all of the above mentioned problems, and other technical problems.

SUMMARY OF INVENTION

Aspects and examples of the present disclosure aim to address at least a part of the above described technical problems and/or related problems. Aspects of the invention are as set out in the independent claims and optional features are set out in the dependent claims. Said aspects and examples may provide a more efficient way of determining the risks of a patient developing a plurality of different medical conditions, based on a range of particular physiological values that they present, and may also more efficiently provide a recommended course of action for diagnosing the condition. They may also enable more effective identification of conditions a patient is at risk of and provision of a recommended treatment pathway based on the individual requirements of a particular health authority or clinician.

In one aspect there is provided a method for diagnosing a medical condition in a patient, the method comprising: obtaining, from the patient, a plurality of physiological values; implementing a first model configured to determine risk values for at least one of a plurality of medical conditions, based on the physiological values; wherein implementing the first model comprises obtaining a first risk value for the at least one medical condition, based on a first one of the obtained physiological values, and weighting the first risk value based on a second one of the obtained physiological values, to determine a risk value of the at least one medical condition for the patient.

In one aspect there is provided a method for diagnosing a medical condition in a patient, the method comprising: obtaining, from the patient, a plurality of patient factors; implementing a first model configured to determine risk values for at least one of a plurality of medical conditions, based on the patient factors; wherein implementing the first model comprises weighting a baseline risk value for the at least one medical condition, based on the obtained patient factors, to determine a risk value of the at least one medical condition for the patient.

In one aspect there is provided a method for diagnosing a medical condition in a patient, the method comprising: obtaining, from the patient, a plurality of physiological values; implementing a first model configured to determine risk values for at least one of a plurality of medical conditions, based on the physiological values; wherein implementing the first model comprises applying a weighting to the physiological values; and determining a risk value for at least one of the medical conditions based on the weighted physiological values.

Each risk value may indicate the likelihood of a patient having the corresponding medical condition.

Implementing the first model may comprise sequentially weighting the baseline risk value, by each of the plurality of physiological values in turn.

Implementing the first model may comprise determining a risk associated with each of the physiological values, and may further comprise combining each of the associated risks to provide a risk value for at least one of the medical conditions. Weighting the physiological values may comprise applying a weighting factor to each of the physiological values. For example the weighting factor may be constant, or it may define a mathematical function. Determining a risk value for at least one of the medical conditions may comprise combining the weighted physiological values. Applying a weighting factor may comprise obtaining data comprising the weighting factor, and/or calculating the weighting factor for example based on data indicating an association between physiological parameters corresponding to the physiological values, and the plurality of medical conditions; for example the data may be obtained from a data store.

Applying a weighting may comprise using a second set of values to modify the calculated risk values. For example the second set of values may indicate further patient information, for example demographic data for the patient.

Mapping data may be provided, for example stored and obtained, e.g. by a processor, and used by the first model. The mapping data may indicate, for each of the plurality of medical conditions, a subset of physiological parameters that are relevant for the calculation of a risk value for that condition. The mapping data may alternatively or additionally provide a subset of medical conditions for each physiological parameter, for example it may comprise an indication for each physiological parameter whether it is relevant for the assessment of the risk for each of the medical conditions, the medical conditions selected. The first model may map each of the obtained physiological values to the medical conditions to which they have an associated risk, based on the mapping data. Therefore, for a given set of physiological values, only a subset of the medical conditions may be selected, and the only the risk value for those conditions may be calculated, modified and/or weighted.

Data may be obtained by the first model comprising an indication of a functional relationship between the percentage risk of having one or more of the medical conditions and a physiological parameter corresponding to a numerical physiological value; e.g. the risk value for one or more of the plurality of medical conditions may vary as a mathematical function of the physiological parameter. For example there may be a proportional, exponential or any other mathematical relationship between the parameter and the risk value for a medical condition. The weighting data may comprise this indication.

The method may further comprise comparing each of the total risk values with a selected threshold, and, in the event that one or more of the total risk values exceeds the corresponding threshold, selecting at least one diagnosis pathway for diagnosing the corresponding medical condition.

Selecting a diagnosis pathway may comprise implementing a second model configured to select at least one of a plurality of possible diagnosis pathways, based on a plurality of sets of pathway parameter values, wherein each set is associated with one of the diagnosis pathways.

Implementing the second model may comprise, in the event that one of the parameter values meets a threshold value, selecting the associated pathway.

The method may further comprise obtaining a patient data set comprising: a set of physiological values; and a set of indications each identifying the presence or absence of a diagnosis of one of the plurality of medical conditions; and modifying the first model based on the patient data set.

The method may further comprise:
  obtaining a diagnosis pathway data set for one of a plurality of diagnosis pathways, said pathway data set comprising a plurality of pathway parameter values for that diagnosis pathway; and
  modifying the second model, based on the pathway data set.

Modifying the second model may comprise weighting each of the pathway parameter values associated with that diagnosis pathway in the second model by the corresponding obtained pathway parameter value.

At least one of the first model and the second model may comprise a Bayesian model.

In one aspect there is provided a method for diagnosing a medical condition in a patient, the method comprising: obtaining, from the patient, a plurality of physiological values;
  mapping the physiological values to a plurality of associated medical conditions; determining, based on the mapped physiological values, a total risk value associated with each of the medical conditions; comparing each of the total risk values with a threshold; and in the event that the total risk value for a condition exceeds the threshold, outputting diagnosis pathway data for diagnosing the medical condition.

Determining a total risk value associated with each medical condition may comprise determining, for each physiological value, an indication of the risk associated with each of the medical conditions to which it is mapped.

The method may further comprise obtaining risk data indicating predetermined associations between a plurality of physiological parameters and the plurality of medical conditions; wherein at least one of mapping the physiological values to the plurality of medical conditions; and determining the total risk value for each of the medical conditions; may be based on the risk data.

Outputting diagnosis pathway data may comprise selecting at least one out of a plurality of possible diagnosis pathways.

The method may further comprise obtaining, for each of the possible diagnosis pathways, a plurality of pathway parameter values; and selecting at least one of the pathways may be based on the pathway parameter values.

Selecting at least one out of a plurality of possible diagnosis pathways may comprise selecting a pathway if any of the parameter values for that pathway meet a corresponding threshold value.

The determination of a total risk value for a condition may comprise iterating over previous patient data. The previous patient data may comprise a plurality of data sets each associated with a patient, and each data set may comprise: a set of physiological values; and a set of indications each identifying the presence or absence of a diagnosis of one of the conditions.

The method may further comprise modifying the total risk value for at least one of the conditions, based on the previous patient data.

The method may further comprise modifying the pathway parameter values based on the previous patient data.

The physiological values may relate to any one or more of several different classes of patient factors and parameters, for example that may include, but are not limited to, signs and symptoms exhibited by the patient, investigation or test results, demographic data and risk factors (such as whether the patient smokes, is overweight etc.).

In another aspect there is provided a method of training an artificial neural network for diagnosing a medical condition, the method comprising:
  implementing, as a neural network, a first model configured to provide an association between:
    a set of physiological parameters, and
    a risk value for at least one of a plurality of medical conditions,
to output an indication of the total risk for the at least one medical condition from obtained physiological values corresponding to the physiological parameters;
  obtaining a patient data set comprising:
    a set of physiological values; and
    a set of indications each identifying the presence or absence of a diagnosis of one of the plurality of medical conditions; and
  modifying the first model based on the patient data set.

The method may further comprise obtaining a plurality of said patient data sets, and iteratively modifying the first model based on each of the patient data sets.

The patient data set may further comprise a pathway data set for one of a plurality of diagnosis pathways, said pathway data set comprising a plurality of pathway parameter values for that pathway, and the method may further comprise:
  implementing, as a neural network, a second model configured to:

a) provide an association between each of the plurality of pathway parameters and each of the plurality of diagnosis pathways; and
b) to select one of the diagnosis pathways based on the modified second model and the obtained physiological values; and modifying the second model, based on the pathway data set.

The method may further comprise iteratively modifying the second model based on each of the patient data sets.

In one aspect there is provided a computer program product, comprising program instructions configured to program a processor to perform any of the methods described.

BRIEF DESCRIPTION OF THE DRAWINGS

Embodiments of the disclosure will now be described in detail with reference to the accompanying drawings, in which:

FIG. 5 shows another example process for providing risk and diagnosis information to a clinician, using machine learning.

SPECIFIC DESCRIPTION

Figure 1:
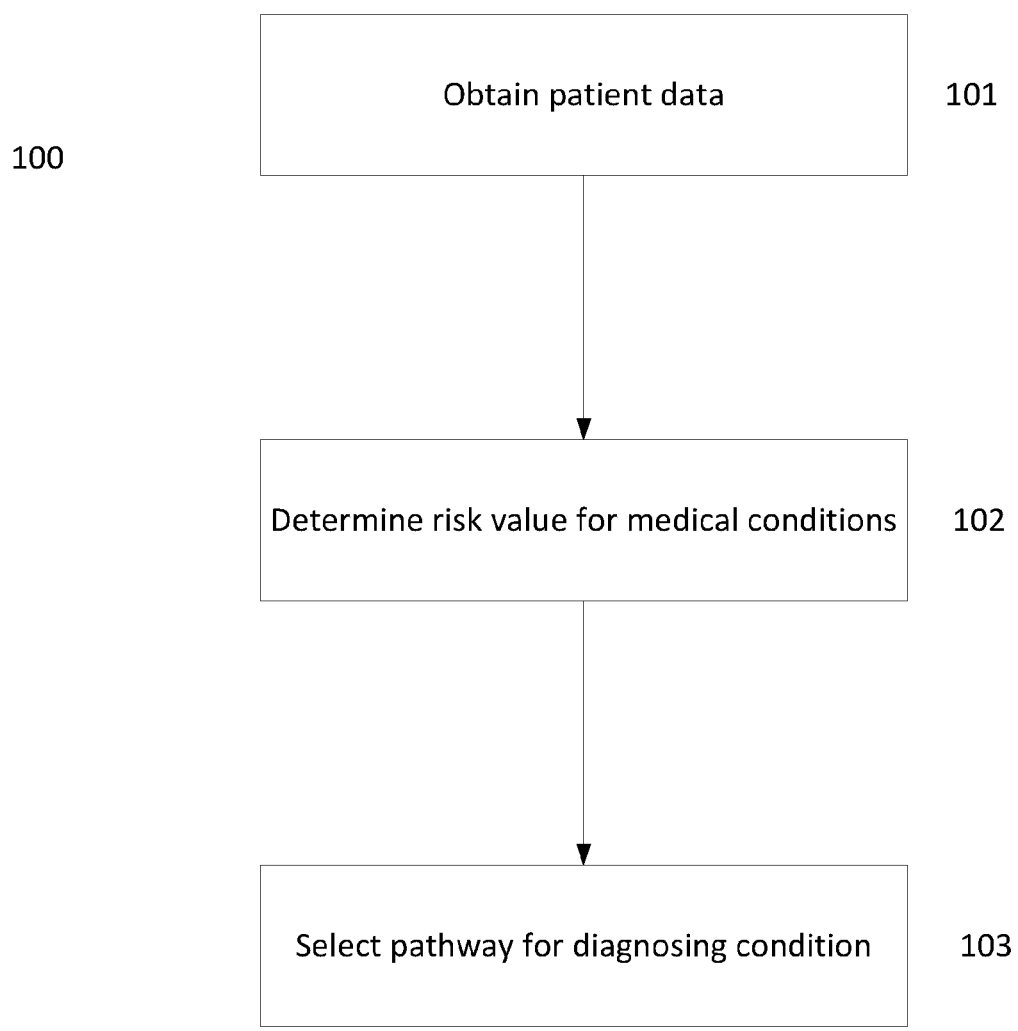
FIG. 1 outlines an example process for providing risk and diagnosis pathway for one or more medical conditions to a clinician.

FIG. 1 gives a general overview of a process 100 that may be used to select a diagnosis pathway for diagnosing a medical condition. Such a process may enable a clinician to efficiently receive information regarding the risk of a patient having one or more medical conditions, and a recommended pathway for diagnosing those conditions, based on data obtained from the patient and the relevant rules and guidelines of the particular health service to which the clinician belongs. Each of the steps described may be performed by a controller at a server, that may for example be connected to a plurality of devices at which relevant data can be inputted, e.g. over a Wide Area Network (WAN).

In this example, as a first step, data for a patient is obtained 101, for example by a processor. For example, the data may comprise patient factors, such as physiological values relating to the patient, as is described in more detail below. The data may be inputted into a computing device such as a PC, smartphone or tablet by a clinician who is examining a patient, and sent to an external server. These data are then used to determine 102 the risk value for one or more medical conditions, e.g. a percentage risk for several conditions that the patient may have, based on the collected values. If it is determined that the patient is at risk of one or more of the conditions, e.g. if it is determined that the patient has a risk calculated to be higher than a selected risk threshold, one or more suitable diagnosis pathways are selected 103 for diagnosing that condition. This information, for example the conditions of which the patient is at risk, and the selected diagnosis pathway may then be provided back to the device of the clinician e.g. to be displayed. Each of these steps is described in more detail below with reference to the subsequent figures.

Figure 2:
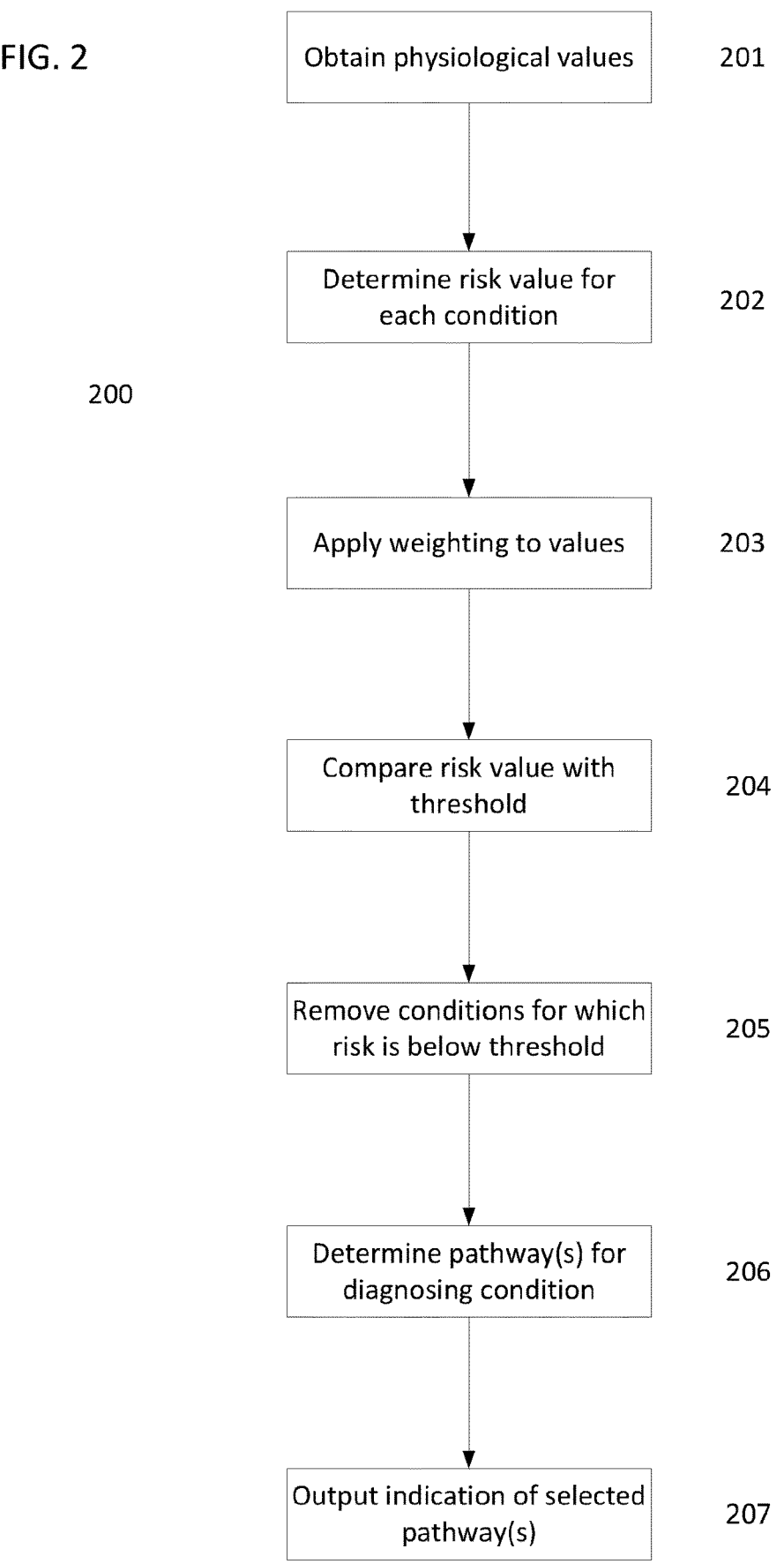
FIG. 2 illustrates an example of a process for providing a diagnosis pathway for one or more medical conditions based on patient physiological values.

FIG. 2 illustrates an example process 200 performed by a controller of a computing device for determining both a patient's risk of having one or more particular medical conditions, and a suitable diagnosis pathway for diagnosing such a condition. In this example, firstly, physiological values for a patient are obtained 201. It will be understood that said physiological values may relate to any one or more of several different classes of patient factors and parameters that may include, but are not limited to, signs and symptoms exhibited by the patient, investigation or test results and risk factors (such as whether the patient smokes, is overweight etc.), and/or demographic data. These values may be entered by a clinician into a computing device, for example at a user interface of their device using an application. By way of example, the values may be a positive or negative indication relating to the presence or absence of a sign or symptom exhibited at a clinical appointment; the results of a particular clinical test (blood, urine test etc.) indicating the presence or absence of a particular substance or a numerical value indicating the concentration of a particular substance; a weight, height, BMI, and age value, an indication of the medical history of the patient—e.g. a previous diagnosis of any previous conditions they were diagnosed with, and other demographic data.

Some or all of this physiological value data may be recorded by the clinician and entered into their device at an examination or appointment with the patient. Alternatively this data may have been previously recorded and stored in a data store. The physiological values inputted at the clinician's device may be sent to a remote server over such a network and the calculations described herein may be performed at the server. Where the physiological value data is stored in a data store, such a store may be local to the server, or alternatively may be accessible over a network such as a WAN, such that a controller of the server may obtain and/or extract the physiological value data from the data store.

These values are then used to determine a risk value for at least one of a plurality of medical conditions. The plurality of medical conditions may comprise a predetermined set of conditions, wherein risk vales may be obtained for each condition in the set. As just one example, the plurality of medical conditions could correspond to several different types of cancer.

It will be understood that a risk value may refer to the likelihood of the patient having a medical condition; for example if, for a given combination of physiological values, a 6% risk value for a medical condition was calculated, that would indicate that 6 out of 100 patients who presented with that particular combination of physiological values would be expected to have that condition.

These risk values may be calculated by a first model, based on known and/or predicted associations between the parameters to which the obtained values correspond and the plurality of conditions. For example the first model may comprise decision-tree logic, and each obtained physiological value may be cross-referenced across the decision-tree logic to calculate the risk values for each of the medical conditions. The decision tree logic used may be specific to the particular healthcare provider (e.g. a clinical commissioning group) that a user, e.g. a clinician, belongs. In particular, data indicating the association between parameters such as the examples given above and the likelihood of the having a particular medical condition may be obtained. This data may comprise statistical correlations based on one or more sets of stored data such as clinical guidelines. For example, a set of guidelines may provide, for each of the physiological values, a set of percentage risks indicating the likelihood of a diagnosis for a plurality of medical conditions. For example, where the physiological value simply indicates the presence of a particular symptom, there may be an increase in the risk for one or more of the plurality of medical conditions associated with that value. Alternatively, where the physiological value is a numerical value, there may be a functional correlation between the percentage risk of having one or more of the medical conditions and the parameter to which that numerical value relates; e.g. the risk value for one of the conditions may vary as a mathematical function of the physiological parameter. For example there may be a proportional, exponential or any other mathematical relationship between the parameter and the risk value for a medical condition. As one example, if the physiological value relates to a numerical physiological parameter such as the concentration of a substance detected in a blood test, the risk of the patient having a given condition may increase as the concentration increases, according to a particular functional relationship defined by the guideline data.

The first model may use this data (e.g. from the guidelines) to calculate risk values for one or more of the medical conditions, based on the obtained physiological values. For example, the model may, for each obtained physiological value, use the guideline data to determine a risk value for each of a plurality of medical conditions associated with that individual physiological value. The first model may then further combine each of these risk values, so that a total risk value for each of the plurality of medical conditions is determined for the particular combination of physiological values obtained.

Table 1 below shows just one example, in which various combinations of physiological values, in this case symptoms presented, that can be used to determine the percentage risk for several different types of cancer.

TABLE 1

| No. | Factor combination | Risk calculated | Cancer type |
|---|---|---|---|
| 1 | Unexplained cough alone | 0.1% | Lung cancer |
| 2 | Weight loss alone | 2.5% | Bowel cancer |
| 4 | Appetite loss alone | 2.1% | Ovarian cancer |
| 5 | Unexplained cough and weight loss | 3.2% | Lung cancer |
| 6 | Weight loss and appetite loss | 5.2% | Bowel cancer |
| 7 | Appetite loss and unexplained cough | 2.8% | Lung cancer |
| 8 | Appetite loss, unexplained cough and weight loss | 8.4% | Lung cancer |

The first model combines the risk values for each physiological value to provide a total risk value for each of the conditions, based on the guideline data. For example, for each medical condition there may be a baseline risk value corresponding to the known or estimated prevalence of that condition in the population at large. This data may be stored at the server and accessed by the controller to perform the calculation. For example a lookup table may indicate the baseline risk for each of a plurality of medical conditions.

The first model may then modify the baseline risk values in response to obtaining the physiological values discussed above, based on those physiological values. For example the model may weight each of the baseline risk values for each of the conditions by each of the obtained physiological values.

For each of the plurality of medical conditions, data indicating the baseline risk may be obtained, and sequentially modified based on the obtained physiological values. For example, the guideline data discussed above may comprise the baseline risk data. Each physiological value obtained may have associated with it a plurality of weighting factors, each of which may correspond to one of the medical conditions. In response to obtaining a particular physiological value, the first model may modify the baseline risk for each medical condition based on each of the weighting factors associated with that physiological value, (e.g. the risk may be multiplied by the weighting factor). This process may then be repeated for each obtained physiological value in sequence, e.g. as shown in Table 1 above. It will be understood that the sequential modification of the risk values may not simply comprise a simple linear addition, and that the first model may also obtain and apply further weighting factors to modify the risk values based on the overall combination of physiological values obtained. The guideline data may comprise all the weighting factors described above, or alternatively the weighting factors may be determined based on information obtained from the guideline data.

In some cases data from a plurality of data sources, for example multiple sets of guideline data, are obtained and combined by the first model for use in performing the risk value calculations described above. For example, each set of guideline data may provide statistical correlations between physiological parameters and the plurality of medical conditions as described above, and the first model may determine a new correlation between the physiological parameters and the medical conditions by combining the data from each of the data sources (e.g. data from each of the guidelines). For example the model may weight the data provided by each of the data sources to provide the relationship between the physiological values and medical conditions, for example using pre-selected weightings that may have be selected by the clinician and/or wider health service due to the relative importance they place on the data sources. For example where different sets of guidelines or data from differing sources provide different numerical relationships between a physiological parameter and a risk value for one of the medical conditions, the two or more data sets may be combined. For example the values or functions representing the correlation may be averaged, and this average may be weighted by a weighting factor applied to each data set. For example, where the data set provides the correlation data is from a preferred source, this data may be weighted more heavily than that from a less preferred source. This weighting data may also be stored at the server.

The weighting factors discussed above that are used by the first model to calculate the risk values for each medical condition may be calculated based on an average of weighting factors obtained from different sets of guideline data. For example, where two or more sets of guidelines provide a weighting factor for a particular medical condition and physiological value, the two factors may be averaged to obtain a new weighting factor for the first model to apply to the risk values. This averaging may be a weighted average, for example the average may be weighted based on the source of the guideline data—e.g. a more trusted or preferred source of guideline data may be weighted more heavily than a less preferred one.

In some examples, the guideline data further comprises mapping data. This mapping data may indicate, for each of the plurality of medical conditions, those physiological parameters that are relevant for the calculation of a risk value for that condition. In some examples the mapping data may alternatively or additionally comprise an indication for each physiological parameter whether it is relevant for the assessment of the risk for each of the medical conditions, the medical conditions selected. The first model may therefore use this mapping data to map each of the obtained physiological values to the medical conditions to which they have an associated risk. As such, for a given set of physiological values, only a subset of the medical conditions may be selected, and the only the baseline risk value for those conditions may be modified, e.g. based on the weighting factors discussed above.

The mapping data may be stored as a lookup table, for example at the server. The controller may therefore, based on the obtained physiological values, map the values to the particular conditions to which they are relevant, and modify the baseline risk based on the stored statistical correlations between the parameters and the conditions.

In other examples a full set of risk values may be determined for every physiological value, for example a risk value associated with every medical condition (e.g. every medical condition in the set) may be determined for each physiological value. This calculation may be based on the guideline data discussed above. In such examples mapping data may not be obtained or used, and for example even if a physiological value was not relevant to the determination of a risk of one of the conditions, (e.g. the weighting factor for that condition is zero) a risk value for that condition is still calculated.

The order of operation of the calculations may vary in different examples. For example each physiological value may firstly be mapped to a plurality of conditions, and a risk value for each of the conditions may be calculated by modifying the baseline risk for that condition. This may be repeated for every obtained physiological value, such that each risk value is modified sequentially for each obtained physiological value, to determine a cumulative risk value for each of the conditions for the particular combination of obtained physiological values.

In other examples a risk value may be determined for each of the medical conditions in turn. For example, a first risk value for a first medical condition to which at least one of the physiological values is mapped may be determined, based on the combination of physiological values, followed by a second medical condition and so on.

The calculated risk values may in some examples be weighted 203 by additional factors, such as demographic data, to modify the calculated risk values. Such data may be obtained from a data store of the server or an external device as set out above. As just one example, this weighting data may comprise geographic data for the patient, as the risk of a diagnosis of a condition for a patient exhibiting one set of symptoms in one location may be different from another patient exhibiting the same symptoms in a different location, for example based on the environmental characteristics of that area. The weighting data may also include age, gender, and ethnicity data for example. In other examples, this data may instead be provided as part of the physiological values obtained as set out above at step 201. In this case these factors may be simply combined with the other physiological values such as symptoms etc. by the model in a single step to determine the risk values for each of the medical conditions.

In other examples this weighting data is used before the introduction of physiological values, to modify the baseline risk value for each of the plurality of conditions.

A look-up table may be generated for each patient, listing all the physiological values obtained for that patient as well as weighting (e.g. demographic) data. Each item in the table may then be associated with a corresponding risk value for each of the plurality of medical conditions and the particular set of values combined for each condition to provide a total risk value for each of the conditions.

Each of the calculated total risk values for each of the conditions are then compared 204 with a threshold. Such a threshold may be a predetermined value based on the preferences and/or requirements of the clinician or wider health service. Data indicating the threshold may be stored at the server, and obtained by the controller to apply to the calculated risk values for each medical condition, e.g. as a filter. If the calculated risk value is greater than the threshold values then that condition is selected and carried forward for the remainder of the process, and all conditions for which the calculated risk value is less than the threshold are removed or discarded 205.

A different threshold may be selected and applied depending on the health provider to which the user accessing the service belongs. For example a user, such as a clinician may belong to a particular health provider having an associated user identifier, e.g. a group identifier. In this way when the clinician uses the service, for example by logging on to an application at their device and inputting values as discussed above, the data obtained by the server from the device may include the identifier. As such the relevant threshold for the corresponding health provider may be selected and applied to the calculated risk values for the patient.

For the one or more conditions for which the determined risk value is greater than the threshold, a particular diagnosis pathway 206 is determined. Such a pathway may be determined based on stored data, e.g. based on the guidelines and data sources discussed above, which indicates preferred diagnosis pathways for the particular condition, for example for the particular healthcare provider of which the user is a part. As an example, a data store may comprise, for each of the medical conditions, a list of one or more available pathways, e.g. in the form of a lookup table. In response to one of the medical conditions being selected as above, the controller may obtain data indicating the corresponding diagnosis pathways from the table.

Alternatively or additionally, the pathway may be determined based on the obtained physiological values and a set of pathway parameters, wherein each pathway has an associated set of parameter values for each of the pathway parameters. These values may be stored at a data store e.g. at the remote server or device. Alternatively these values may be calculated based on stored data and the obtained physiological values. Table 2 below shows one example of this data for three different diagnosis pathways for one particular combination of physiological values.

TABLE 2

| Factor combination | Test or referral | Cost | Time to completion | Time to diagnosis | Time to treatment | Sensitivity | Specificity |
|---|---|---|---|---|---|---|---|
| Unexplained cough and weight loss | Chest x-ray | £15 | 2.1 days | 34.3 days | 65.2 days | 61.3% | 73.4% |
| Unexplained cough and weight loss | CT chest | £150 | 7.4 days | 24.1 days | 52.1 days | 95.2% | 92.3% |

TABLE 2-continued

| Factor combination | Test or referral | Cost | Time to completion | Time to diagnosis | Time to treatment | Sensitivity | Specificity |
|---|---|---|---|---|---|---|---|
| Unexplained cough and weight loss | Chest referral | £250 | 13.2 days | 27.6 days | 61.9 days | 92.1% | 98.1% |

A threshold may be set for one or more of these parameters, for example a maximum time to completion, a maximum time to diagnosis, a maximum time to treatment, a maximum cost, a minimum sensitivity and/or a minimum specificity. Each pathway that meets all of the relevant thresholds may be selected. Alternatively one of the pathways may be selected based on a combination of each of the pathway parameter values and the physiological values. For example a weighting may be applied to each of the pathway parameters, and the parameter values for each pathway may be combined based on the weightings to provide a rating or score for each pathway, with the pathway having the best rating may be selected. Alternatively one of the pathways out of those available that has a lowest or highest value for one of the parameters may be selected. Alternatively a combination of the above methods of selection may be used to select one or more pathways for diagnosing the condition.

The selection of a diagnosis pathway may also be based on the obtained user identifier data discussed above, e.g. data obtained by the server from a user's device when the user logs on to the service. For example the user identifier may indicate the healthcare provider to which the user belongs. The server may obtain the user identifier from the device, and in response, obtain data relating to the healthcare provider, (e.g. from a data store at the server). For example, data indicating the diagnosis pathways available in that provider, and/or data indicating the pathway parameter thresholds described above may be obtained. A diagnosis pathway may therefore be selected based on this data.

In other examples the user identifier data may itself comprise indications of the diagnosis pathways available to that provider and may further comprise data indicating the pathway parameter thresholds described above, such that this data is obtained directly by the serer from the user's device.

Once the one or more pathways have been selected, an indication identifying them is outputted 107 to a user, such as a clinician. For example where the steps above are performed at a server, the indication may be provided to a clinician's computing device over a network where it can be displayed to the clinician, who can then take the appropriate action. The data sent to the clinician's device may include:
 data identifying the medical conditions for which the patient has a calculated risk greater than the relevant threshold; and
 data identifying the selected pathways for diagnosing those conditions as well as further information about both the conditions and pathways.

Figure 3:
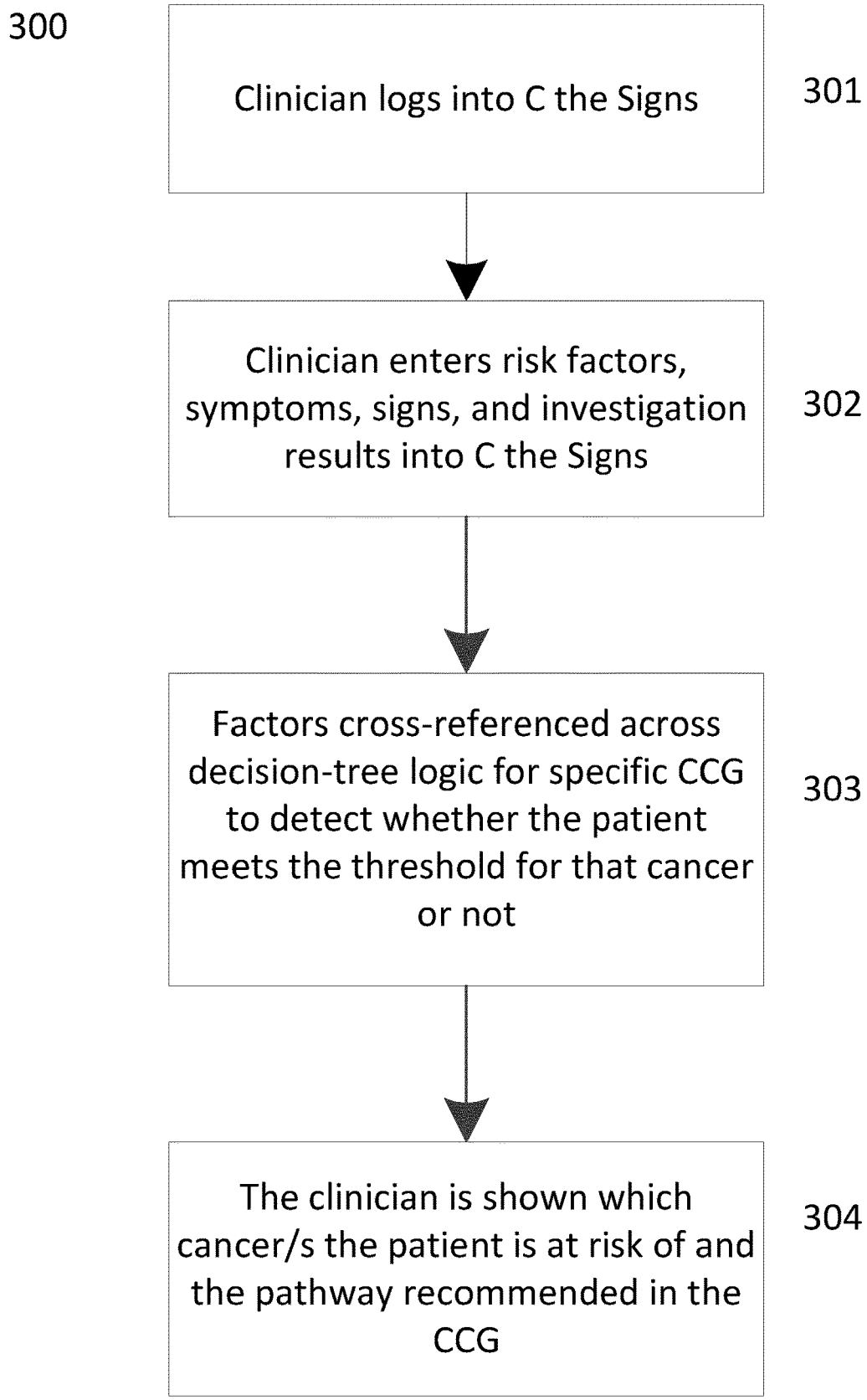
FIG. 3 illustrates an example process for providing risk and diagnosis information to a clinician.

FIG. 3 shows another example of a process 300 for providing patient risk and recommended pathway information to a clinician, using an application. In this method a clinician initially logs into the application 301 on a device such as a PC, smartphone or tablet computer. Once this is performed the clinician is presented with a user interface e.g. a form with fields into which they can enter data 302 relating to the patient, such as physiological values which may include risk factors, symptoms, signs investigation results, as described above. This data is then obtained by a first model, and used to determine the risk the patient has of having each of a plurality of conditions, for example different types of cancer, and detects whether any of those risks meet the threshold for that condition, e.g. as described above. For example the first model may comprise decision-tree logic for the particular healthcare service (e.g. a clinical commissioning group) of which the clinician and/or patient is a part, and the physiological value data may be cross-referenced 303 across the decision-tree logic to calculate the risk values. This determination may be performed according to one or other of the methods described. This cross-referencing and calculation may be performed at a remote server or device, which obtains the data entered by the clinician from their device as described above. A recommended pathway may also be determined for diagnosing the one or more conditions for which the threshold is met, e.g. as described above, and/or based on data and/or guidelines provided by the relevant healthcare service. Once the conditions for which the patient is at risk and a recommended pathway have been identified, this is then shown 304 to the clinician at a user interface of their device. For example data indicating this information may be sent back to the device from the server.

Figure 4:
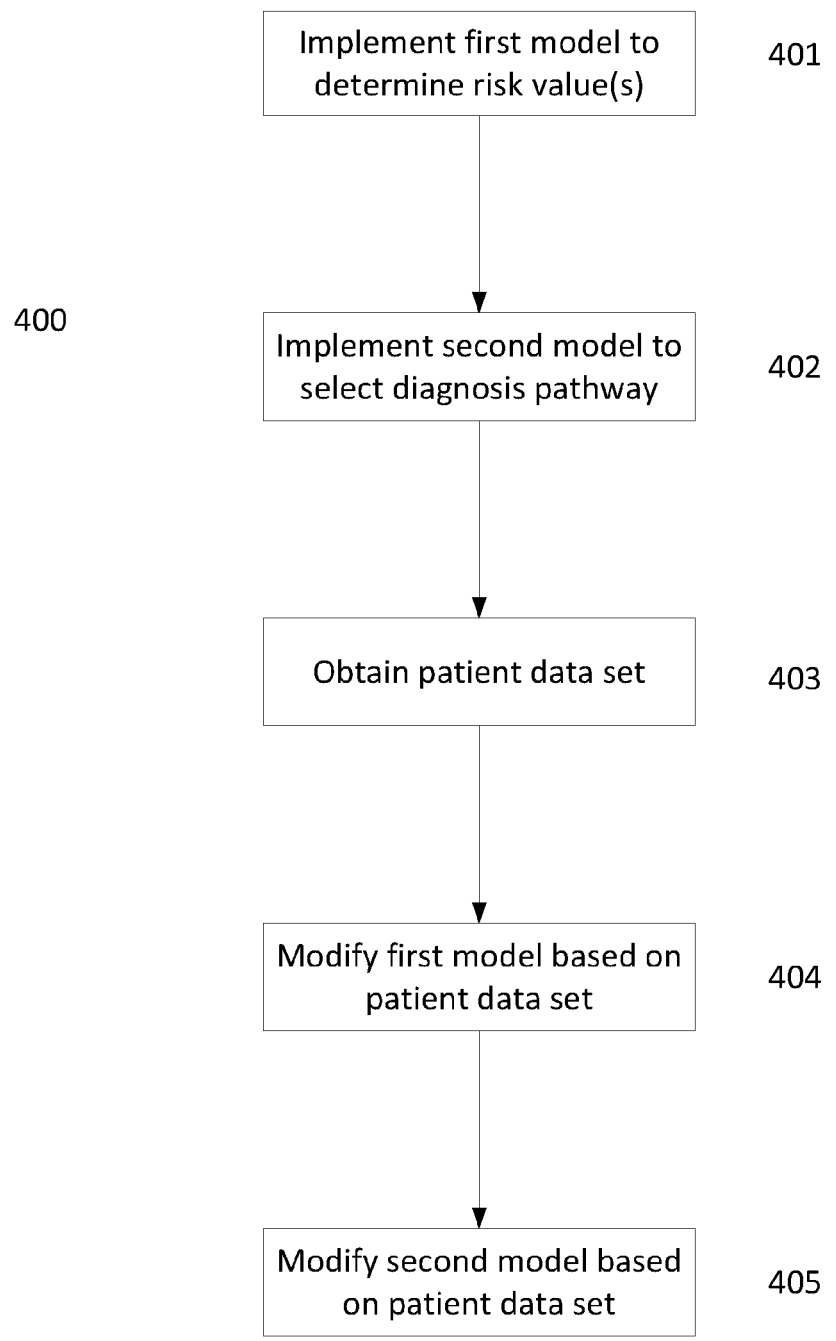
FIG. 4 illustrates an example process using machine learning to provide a diagnosis pathway for one or more medical conditions.

FIG. 4 shows an example of a process 400 of implementing machine learning to improve the determination of the risk values for the medical conditions, and of improving the selection of a pathway for diagnosing the condition.

In this method a first model is implemented 401 to determine, for a patient, the risk values for a plurality of medical conditions and determine which conditions are above a selected threshold, based on physiological values and weighting data substantially as described above. However, whilst in the above described methods the statistical correlations that the first model provides may be based on one or more sets of clinical guidelines, in this method the statistical correlations between the physiological values and the medical conditions may instead or additionally be based on previous patient data that is collected by the process 400 presently described. In particular the first model is modified by the previous patient data as described below.

Once the relevant medical conditions have been identified by the first model, a second model is implemented 402 to select a diagnosis pathway, for example based on the physiological values and the pathway parameter values as described above. However, as with the first model, the parameter values associated with each pathway may, instead of or in addition to being derived from predetermined stored data, be based on, updated, or modified by data collected by the process 400.

Once a pathway has been selected, the progress of the patient can be tracked, values for the pathway parameters obtained and the outcome of the diagnosis (positive or negative) recorded. A patient data set is thus obtained 403, comprising indications of:
 the physiological data obtained for that patient (i.e. patient factors)
 any weighting data (e.g. demographic data);

the risk values calculated for each of a plurality of medical conditions;
the diagnosis pathway(s) selected;
the recorded pathway parameter values for the selected pathways; and
the outcome of the diagnosis pathway (i.e. whether there was a positive or negative diagnosis).

The first model can then be modified 404 based on this data. For example the associations between various physiological parameters and the risk of a medical condition can be updated based on the obtained physiological data for that patient, and the outcome of the diagnosis. For example the first model may comprise a Bayesian model, which implements Bayes' theorem to modify the medical condition risk values associated with a given physiological value or combination of physiological values. In more detail, Bayes' theorem states that:

$$P(A \mid B) = \frac{P(B \mid A)P(A)}{P(B)}$$

In the present case, P(A|B) may correspond to the probability of a patient having a particular one of the medical conditions, given the presence of a particular physiological value or combination of values; P(A) may correspond to the probability of a patient having a particular medical condition in isolation (e.g. the baseline risk of the medical condition); P(B) may correspond to the general likelihood of the patient exhibiting the particular physiological values or combination of physiological values; and P(B|A) may correspond to the probability of a patient who has the particular medical condition exhibiting the particular physiological value or combination of values. Thus by recording the outcome data of patients, and the initial physiological values they exhibited, probabilities can be updated, so that the likelihood of a patient having a particular one of the medical conditions given the presence of a particular physiological value or combination of values (i.e. P(A|B)) can be updated. This process may be performed iteratively, such that this probability is updated each time a new patient's data is recorded.

Similarly, the second model can be modified 305 based on this data. For example the parameter values for a particular pathway can be updated based on the corresponding values recorded for the pathway used for that particular patient. In this case, the pathway parameter values relating to each of the diagnosis pathways (described above), may be modified based on the recorded values for each diagnosis pathway when a patient uses that pathway. The second model may also comprise a Bayesian model.

This process can be performed iteratively, with both the first and second model updated for each patient on whom the process 400 is performed.

FIG. 5 shows another process 500 of providing patient risk and recommended pathway information to a clinician, using machine learning techniques. In this method, as a first step 501, patient physiological values may be entered into the application as described above and provided to a remote server or device. Alternatively or additionally such data may be obtained by the server from a data store such as an electronic health record. Once these values are obtained, an initial risk is calculated for one or more conditions, based on the particular combination of obtained values e.g. using methods described above. The demographic data may be entered by a clinician at their device and obtained therefrom, or this data may have been previously recorded and so is obtained from a data store.

This initial risk is then modified by applying a first Bayesian model 503. In particular, previous patient data from one or more databases is obtained and iterated over, such that the statistical correlations used to calculate the risk values are updated based on real physiological values from a patient. The previous patient data contains physiological values for patients that both did and did not have one or more of the conditions for which a risk is to be calculated. Such databases may be stored in and obtained from a data store local to the server, or may be obtained over a network, e.g. WAN, from other data sources. The initial risk values for each of the plurality of conditions can be updated by iterating over this data. For example each data point may be sequentially used by the first model to modify the parameters used to calculate the risk values, so that an updated risk value is calculated for each data point iterated over. Once all previous patient data in the set has been iterated over, a final cumulative risk value for one or more of the conditions can be provided.

A threshold for detection 504 may be set based on the requirements of the relevant health authority. For example, if the health authority wants all patients that have a greater than 3% risk of having a particular medical condition to be put forward for diagnosis, a threshold will be set at 3%.

As an example an indication of this threshold may be stored at the server and accessed by the model once the risk values have been calculated. The detection threshold may be modified, for example based on the requirements of the particular health authority. For example stored data indicating the threshold may be modified based on data received from a remote device.

The modified risk values are then compared 505 to the threshold. Those conditions, e.g. types of cancer, for which the calculated risk value is greater than the threshold, are then presented. For example data indicating those conditions are sent to the clinician's device and displayed. For those combinations of physiological values for which the risk value is not greater than the threshold for any of the conditions are then excluded 506 from further analysis.

The available diagnosis pathways for each of the conditions may be set 507 based on information from the health authorities. For example multiple tests or referrals may be available for a given condition. This data may also be stored at the server and accessed by the model once the risk values have been calculated. It may also be possible to modify this data, for example based on data received from a remote device. A second Bayesian model 508 may then be applied, based on the combination of physiological values, the data indicating the available pathways, and the previous patient data. In particular, the previous patient data may be stored in a database as set out above, and may also comprise for each patient, in addition to the information set out above, an indication of the diagnosis pathway which that patient went through, as well as pathway parameter values relating to that diagnosis pathway. Such pathway data may include, but not be limited to any one or more of, the cost, time to completion, time to diagnosis, time to treatment, sensitivity and specificity of the pathway, for example as shown in Table 2 above. The second model is configured to determine one or more suitable pathway for treating the one or more conditions the patient is at risk, based on such pathway parameters, wherein the model is updated iteratively based on the previous patient data, for example by sequentially modifying the parameter values associated with each pathway based on each previous patient data point.

The updated model can be retrospectively applied 509 to other patients going through the diagnosis process, to indicate an updated set of parameters such as cost, time and accuracy of each pathway based on the previous patient data.

To determine a recommended pathway, data indicating thresholds for each of the pathway parameters may be set 510, for example based on the requirements of the health authority. For example each parameter threshold (i.e. a minimum and/or maximum) may be set, e.g. like a dial, such that any pathway which meets the requirements for each of the parameters may be selected as a recommended pathway. Once one or more recommended pathways have been selected, they are presented 511 to the clinician, for example along with the indication of the conditions that the patient is at risk of. For example, data indicating the recommended pathway(s) may be sent from a server where the above calculations are performed to a clinician's device, e.g. over a WAN.

It will be appreciated from the discussion above that the embodiments shown in the figures are merely exemplary, and include features which may be generalised, removed or replaced as described herein and as set out in the claims. With reference to the drawings in general, it will be appreciated that schematic functional block diagrams are used to indicate functionality of systems and apparatus described herein. In addition the processing functionality may also be provided by devices which are supported by an electronic device. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

As will be appreciated by the skilled reader in the context of the present disclosure, each of the examples described herein may be implemented in a variety of different ways. Any feature of any aspects of the disclosure may be combined with any of the other aspects of the disclosure. For example method aspects may be combined with apparatus aspects, and features described with reference to the operation of particular elements of apparatus may be provided in methods which do not use those particular types of apparatus. In addition, each of the features of each of the embodiments is intended to be separable from the features which it is described in combination with, unless it is expressly stated that some other feature is essential to its operation. Each of these separable features may of course be combined with any of the other features of the embodiment in which it is described, or with any of the other features or combination of features of any of the other embodiments described herein. Furthermore, equivalents and modifications not described above may also be employed without departing from the invention.

Certain features of the methods described herein may be implemented in hardware, and one or more functions of the apparatus may be implemented in method steps. It will also be appreciated in the context of the present disclosure that the methods described herein need not be performed in the order in which they are described, or necessarily in the order in which they are depicted in the drawings. Accordingly, aspects of the disclosure which are described with reference to products or apparatus are also intended to be implemented as methods and vice versa. The methods described herein may be implemented in computer programs, or in hardware or in any combination thereof.

In some examples a controller may be provided, for example by a general purpose processor, which may be configured to perform a method according to any one of those described herein. In some examples the controller may comprise digital logic, such as field programmable gate arrays, FPGA, application specific integrated circuits, ASIC, a digital signal processor, DSP, or by any other appropriate hardware. In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein. The controller may comprise an analogue control circuit which provides at least a part of this control functionality. An embodiment provides an analogue control circuit configured to perform any one or more of the methods described herein.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

Other examples and variations of the disclosure will be apparent to the skilled addressee in the context of the present disclosure.

The invention claimed is:

1. A method of training an artificial neural network for diagnosing a medical condition, the method comprising:
   implementing, as a first neural network, a first model configured to provide an association between:
      a set of physiological parameters, and
      a total risk value indicative of a risk that a patient has at least one of a plurality of medical conditions;
   implementing, as a second neural network, a second model configured to provide an association between:
      a set of pathway parameters, and
      a set of diagnosis pathways;
   obtaining a patient data set for a first patient in a patient population, the patient data set comprising:
      a set of physiological values for the set of physiological parameters for the first patient,
      an outcome of a diagnosis of the at least one medical condition for the first patient,
      a selected diagnosis pathway of the set of diagnosis pathways, the selected diagnosis pathway having been implemented to obtain the outcome of the diagnosis, and
      a set of pathway parameter values for the set of pathway parameters for the selected diagnosis pathway; and
   modifying the first model and the second model based on the patient data set, the modifying comprising:
      modifying the first model, implemented as the first neural network, based on the obtained set of physiological values for the first patient and the obtained outcome of the diagnosis; and modifying the second model, implemented as the second neural network, based on the selected diagnosis pathway and the set of pathway parameter values.

2. The method of claim 1, further comprising obtaining a plurality of patient data sets, and iteratively modifying the first model based on each of the plurality of patient data sets.

3. The method of claim 2, further comprising iteratively modifying the second model based on each of the plurality of patient data sets.

4. The method of claim 1, wherein implementing, as the first neural network, the first model comprises determining a first total risk value for the at least one medical condition, for the first patient, based on the obtained set of physiological values for the first patient.

* * * * *